United States Patent [19]

Denman Marvin A. et al.

[11] Patent Number: 4,893,233

[45] Date of Patent: Jan. 9, 1990

[54] METHOD AND APPARATUS FOR DYNAMICALLY CONTROLLING EACH STAGE OF A MULTI-STAGE PIPELINED DATA UNIT

[75] Inventors: Denman Marvin A., Austin, Tex.; Yoav Talgam, Tel-Aviv, Israel

[73] Assignee: Motorola, Inc., Schaumburg, Ill.

[21] Appl. No.: 182,630

[22] Filed: Apr. 18, 1988

[51] Int. Cl.⁴ .............................................. G06F 9/38
[52] U.S. Cl. .................................. 364/200; 364/231.8
[58] Field of Search ........................ 364/200, 300, 900

[56] References Cited

U.S. PATENT DOCUMENTS

| | | | |
|---|---|---|---|
| 4,471,432 | 9/1984 | Wilhite et al. | 364/200 |
| 4,598,365 | 7/1986 | Boothroyd et al. | 364/200 |
| 4,648,034 | 3/1987 | Heninger | 364/200 |
| 4,794,524 | 12/1988 | Carberry et al. | 364/200 |

Primary Examiner—Raulfe B. Zache
Attorney, Agent, or Firm—Robert L. King

[57] ABSTRACT

A pipelined data unit for use in a data processor, the data unit having special input operand check logic for involking a precise exception handling mechanism if either or both of the input operands fails the check, and output result format logic for involking an imprecise exception handling mechanism if the output result cannot be provided in a selected format. Special buffers are also provided to allow the control and status information unique to each instruction to flow through the pipeline together with that instruction. Sufficient information relating to each instruction being executed in the data unit is retained and made readily available to the handlers, so that each type of exception may be handled, should recovery be possible.

4 Claims, 4 Drawing Sheets

FIG. 1 —PRIOR ART—

METHOD AND APPARATUS FOR DYNAMICALLY CONTROLLING EACH STAGE OF A MULTI-STAGE PIPELINED DATA UNIT

TECHNICAL FIELD

This invention relates generally to a pipelined data unit for use in a digital data processor, and, in particular, to a multi-stage pipelined data unit adapted to dynamically control each stage of the pipeline.

BACKGROUND ART

In powerful digital data processors, multiple, substantially autonomous data units are commonly employed to allow concurrent or "overlapped" execution of instructions, wherein a different instruction may be simultaneously executing in each of the data units. In simple data units, each instruction may take only a single machine cycle to execute, so that a new instruction may be "issued" to the data unit every machine cycle. In complex data units, several machine cycles may be required to execute an instruction, so that a subsequent instruction for that data unit cannot be issued until the data unit has completed the last instruction issued to it. To minimize the likelihood of such "stalls", the complex data unit may be constructed as a series of relatively independent "stages" which together comprise a "pipeline", such that a different instruction can be concurrently executing at each stage of the pipeline. Both techniques, overlapping and pipelining, allow greatly increased performance. However, having paid the price in hardware to enable the higher performance level, considerable additional investment must be made in sophisticated optimizing compilers and scheduling hardware to fully realize the potential performance levels.

In general, even multi-stage pipelined data units have only a single configuration control register for controlling the operating characteristics for all of the stages of the pipeline. As a result, if a particular instruction requires a different configuration or operating characteristic in one or more of the several pipeline stages than another instruction that is "close" in the instruction stream, then the later instruction in the stream cannot be safely issued until execution of the earlier instruction has been completed. For example, in a floating point type of data unit, it is not at all unusual for consecutive instructions in an instruction stream to need different rounding modes, and the resultant stall reduces the throughput of the data unit.

In some prior art processors, such as the TI ASC, the configuration of the pipeline itself, that is, the number and ordering of the stages used to execute a particular instruction, could be dynamically reconfigured based upon the opcode of that instruction. However, such operating characteristics as rounding mode were either fixed for all instructions or controlled by a single control register.

It would be desirable to provide a mechanism whereby the control information would flow down the pipeline together with the instruction for which that control information is required, so that instructions executing consecutively in the data unit can each have unique control information.

SUMMARY OF THE INVENTION

Accordingly, a primary object of the present invention is to provide a method and apparatus for the control information, if any, for each stage of a pipelined data unit to flow down the pipeline together with other required information relating to the corresponding instruction being executed.

Yet another object of the present invention is to provide a method and apparatus for the status information, if any, for each instruction being executed in a pipelined data unit to flow down the pipeline together with other required information relating to execution of the corresponding instruction.

These and other objects and advantages of the present invention are achieved in a pipelined data unit for use in a data processor, the data unit generally comprising an input stage for selectively receiving input operands from the data processor; a plurality of operation stages for performing selected operations on those input operands to produce an output result, wherein at least one of the operation stages performs its respective operation in one of a plurality of ways as selected by the value of a control signal; an output stage for selectively providing the output result to the data processor; instruction buffers for providing to each of the stages selected information related to a respective one of a plurality of instructions executing in the pipeline stages; and control logic for controlling the execution of the instructions in each of the stages in accordance with the information relating thereto provided by the instruction buffers. In accordance with the present invention, the data unit includes control signal buffers for storing, for each of the instructions, a corresponding value of the control signal, and providing the stored value to the relevant operation stage substantially coincident with the appropriate instruction buffer providing the corresponding instruction information.

DESCRIPTION OF THE INVENTION

Figure 1:
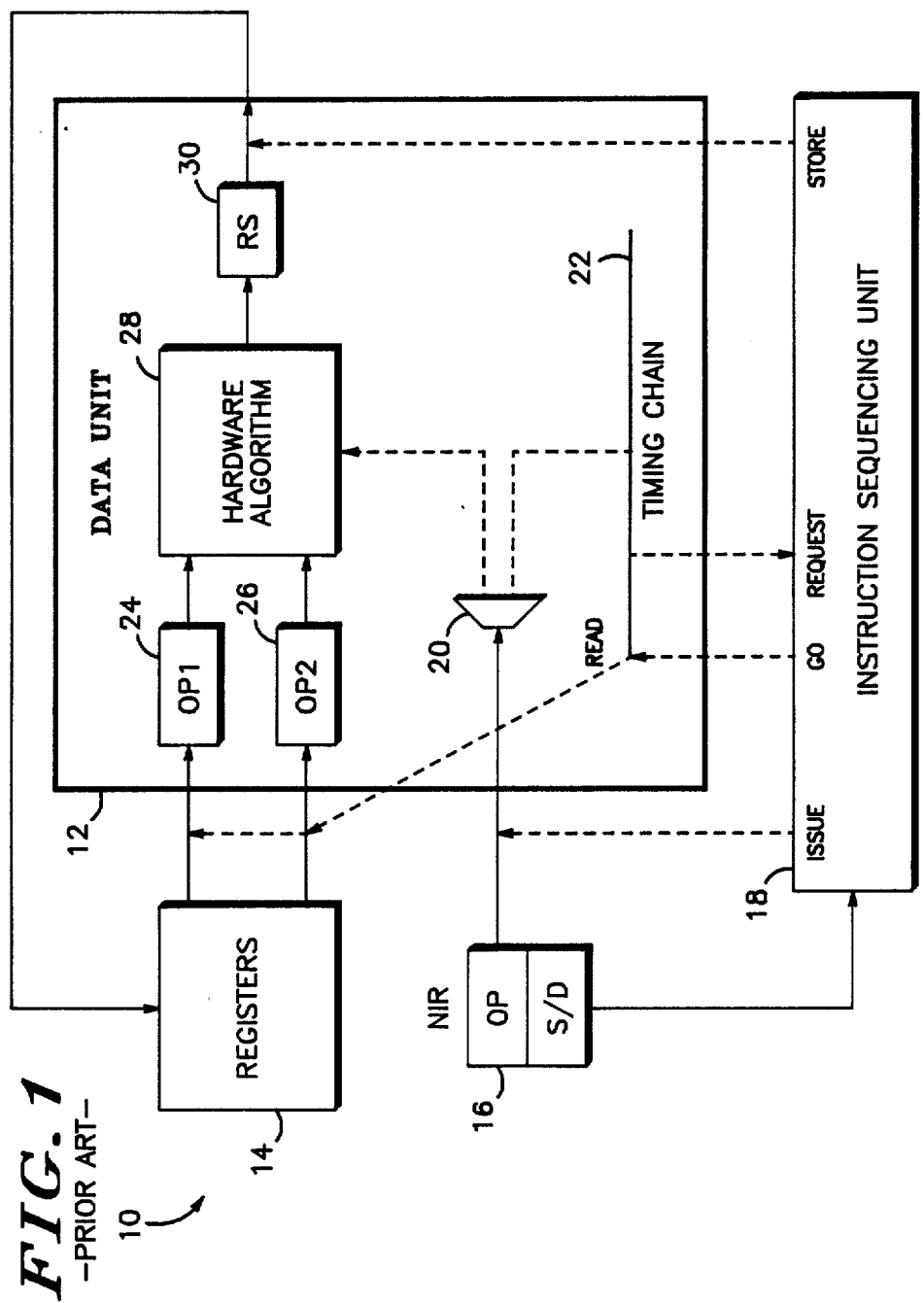
FIG. 1 illustrates in block diagram form a prior art data processor having a pipelined data unit.

Shown in FIG. 1 is a general block diagram of a portion of a prior art data processor 10 including a pipelined data unit 12, a set of operand registers 14, a next instruction register (NIR) 16 and an instruction sequencing unit 18. In general, the processor 10 is similar to the Control Data Corporation 6600, with the data unit 12 being representative of the form of data unit in the 6600. In operation, the instruction sequencer 18 will assert an ISSUE signal to initiate the transfer of the operation code (OP) portion of the instruction in the NIR 16 into a decoder 20 in the data unit 12. When the instruction sequencer 18 determines that the input operands specified by the instruction in the NIR 16 are both available in the respective source (S) registers 14, the instruction sequencer 18 will assert a GO signal to start a timing chain 22 in the data unit 12.

The timing chain 22 will initially assert a READ signal to transfer the input operands from the designated source registers 14 into a pair of input operand buffers (OP1) 24 and (OP2) 26. Once the input operands are latched, a hardware algorithm 28 initiates execution of the specified operation under the control of the decoder 20 and the timing chain 22. Well before the hardware algorithm 28 delivers an output result to a result buffer (RS) 30, the timing chain 22 will assert a REQUEST signal to request permission from the instruction sequencer 18 to write the output result into the designated destination (D) register 14. Assuming no register conflict, the instruction sequencer 18 will assert a STORE signal to transfer the output result to the designated destination register 14 as soon as the result is latched in the result buffer 30. Thus, absent conflicts at the beginning or end of the pipeline, the instruction will "flow" through the data unit 12 with no delays.

In the prior art data processor 10 shown in FIG. 1, no hardware was provided to detect either precise or imprecise exceptions. Instead, the responsibility for detecting such exceptions was delegated to the software. Thus, for example, the user program was expected to examine the input operands and intercept improper values before use. Similarly, the user program was expected to examine output results to determine if such conditions as overflow or underflow occurred, and to take such remedial action as may be possible under the circumstances. Often, nothing could be done to recover from the imprecise type of exceptions, and execution of the user program was simply terminated with an appropriate error message.

Figure 2:
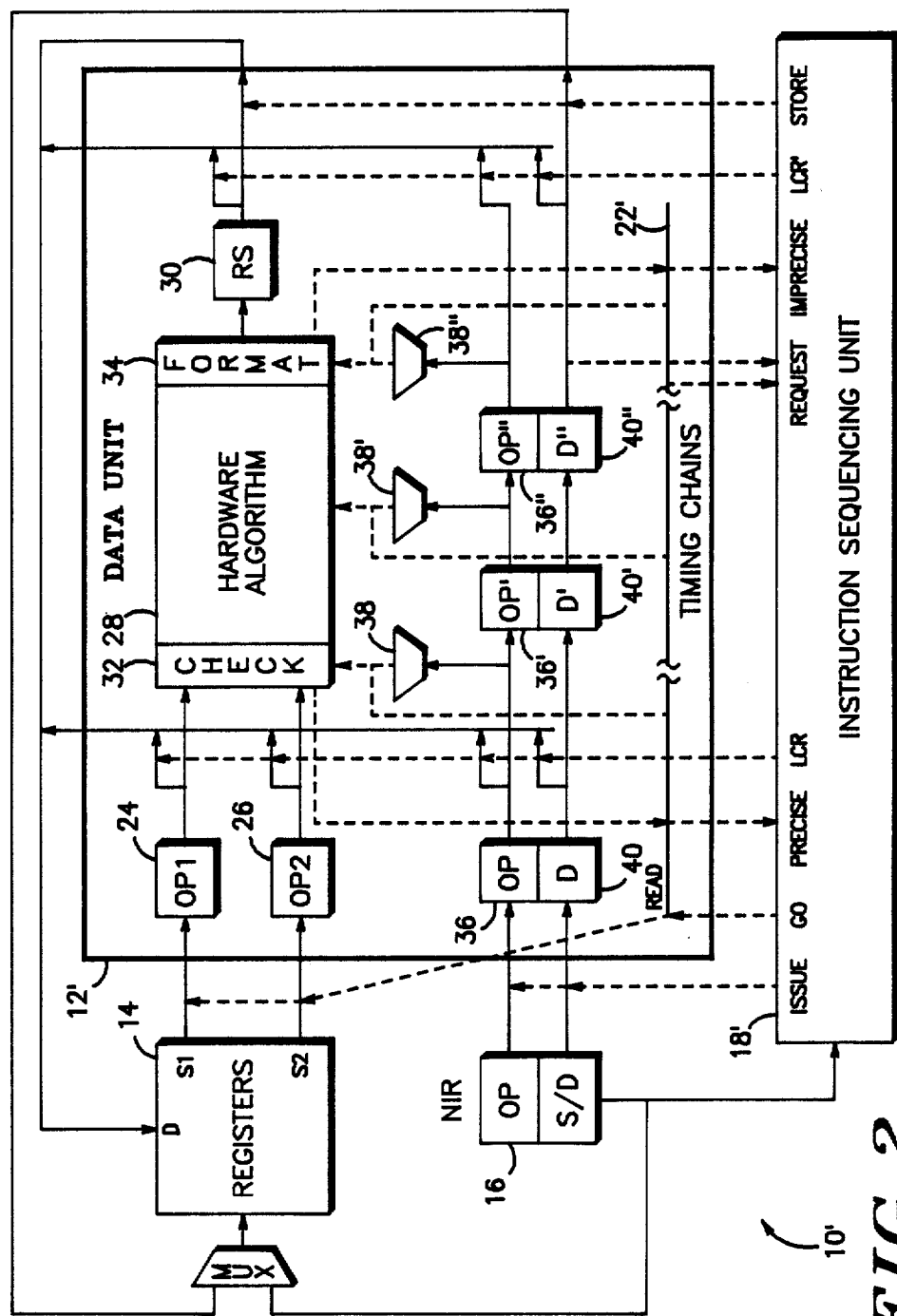
FIG. 2 illustrates in block diagram form a data processor having the pipelined data unit of the present invention.

In the preferred form shown in FIG. 2, the data unit 12' has been "widened", without incurring a time penalty, to include special input operand check logic 32 at the input stage of the pipeline to detect precise exceptions, and output result format logic 34 at the output stage of the pipeline to detect imprecise exceptions. A chain of opcode buffers 36, 36' and 36", with associated decoders 38, 38' and 38", are also provided to retain the operation specification information for the particular instruction at each of the pipeline stages of the data unit 12'.

In the preferred form, a chain of destination designator buffers 40, 40' and 40" are also provided to "remember" the number of the particular destination register 14 that has been designated to receive the result of the instruction being executed at the respective stage of the data unit 12'. This designator is provided to the instruction sequencer 18' at the same time that the REQUEST is made for an opportunity to transfer the result from the result buffer 30 to the designated destination register 14.

If the input operand check logic 32 determines that one or both of the input operands in the input buffers 24-26 are improper for the particular operation specified by the opcode portion of the instruction in the opcode buffer 36, the check logic 32 will assert a PRECISE signal to notify the instruction sequencer 18' of the error. Preferably, the PRECISE signal not only signals the fact that a precise exception was detected, but also the exact nature of the precise exception.

In order to prevent any changes in the state of the processor 10' pending resolution of the precise exception, the PRECISE signal will "halt" the timing chain 22' of the data unit 12'. Simultaneously, all other data units (not shown) in the processor 10' will also halt.

In response to the PRECISE signal, the instruction sequencer 18' will cease to issue further instructions in the present instruction stream, and, instead, will vector in a conventional manner to a special precise exception handling software routine. Upon assuming control of the processor 10', the precise exception handling routine will execute a series of special "load control register" (LCR) instructions to sequentially transfer the current contents of the input operand buffers 24-26, the opcode buffer 36 and the destination designator buffer 40 from the data unit 12' into the registers 14, where they may be readily examined. Depending upon the cause of the precise exception, the precise exception handling routine may be able to simply correct the fault, and allow the processor 10' to resume execution of the user program with the trapped instruction. If recovery is impossible, the precise exception handling routine may simply transfer the input operands and instruction information to system memory, and request the operating system to terminate the user program with the appropriate error message.

If, on the other hand, the output result format logic 34 determines that the output result provided by the hardware algorithm 28 is improper for the particular operation specified by the opcode portion of the instruction in the opcode buffer 36", the format logic 34 will assert an IMPRECISE signal to notify the instruction sequencer unit 18' of the error. In the preferred form, the format logic 34 will simply transfer the "raw" output result into the result buffer 30, so that the maximum amount of result information is available for the recovery. Preferably, the IMPRECISE signal not only signals the fact that an imprecise exception was detected, but also the exact nature of the imprecise exception.

In order to prevent any changes in the state of the processor 10' pending resolution of the imprecise exception, the IMPRECISE signal will "halt" the timing chain 22' of the data unit 12'. However, unlike precise exceptions, the other data units (not shown) in the processor 10' need not also halt.

In response to the IMPRECISE signal, the instruction sequencer 18' will cease to issue further instructions in the present instruction stream, and will vector in a conventional manner to a special imprecise exception handling software routine. Upon assuming control of the processor 10', the imprecise exception handling routine will execute another series of the "load control register" (LCR') instructions to sequentially transfer the current contents of the result buffer 30, the opcode buffer 36" and the destination designator buffer 40" from the data unit 12' into the registers 14, where they may be readily examined. Depending upon the cause of the imprecise exception, the imprecise exception handling routine may be able to adjust the result to compensate for the fault, and allow the processor 10' to resume execution of the user program. If recovery is impossible, the imprecise exception handling routine may simply transfer the input operands and instruction information to system memory, and request the operating system to terminate the user program with the appropriate error message.

Figure 3:
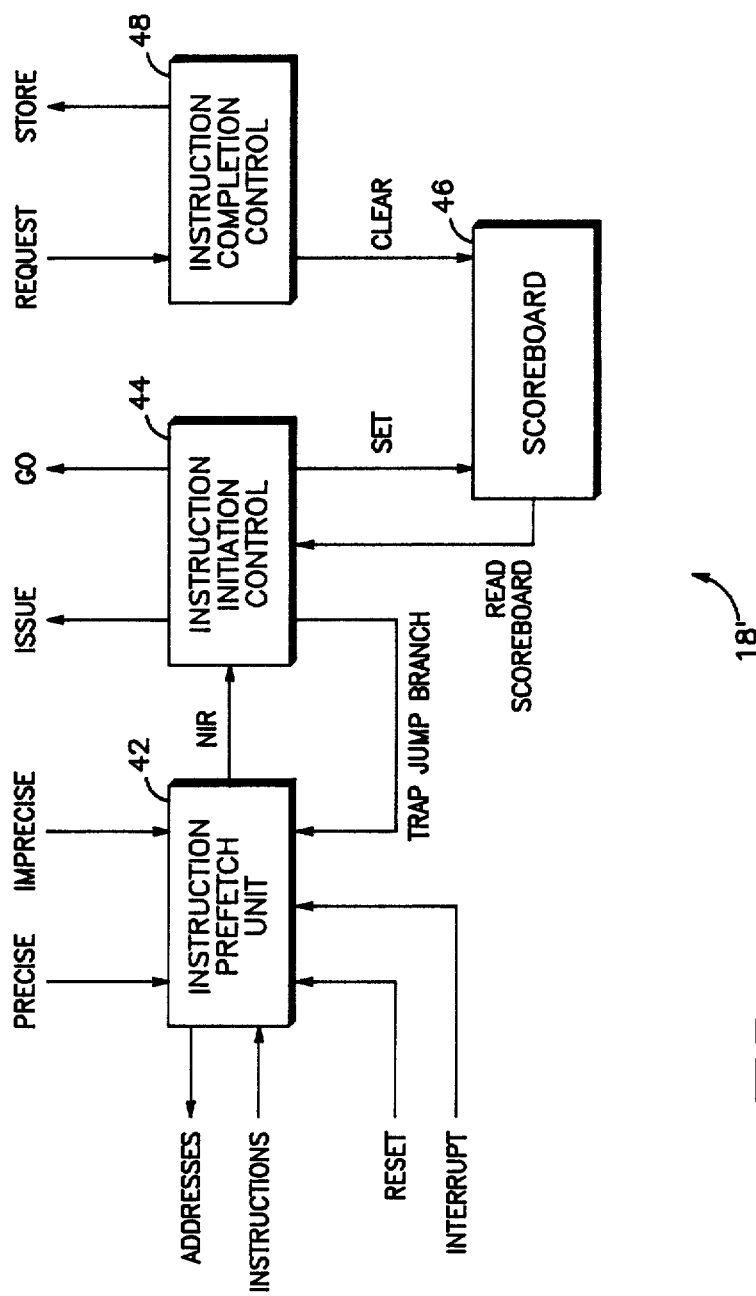
FIG. 3 illustrates in block diagram form the preferred form of the instruction sequencer of the data processor of FIG. 2.

Shown in FIG. 3 is a block diagram of a preferred form of the instruction sequencer unit 18'. In the illustrated form, an instruction prefetch unit 42 maintains a queue of instructions awaiting execution by prefetching instructions in the current instruction stream. If the next instruction is a change of flow, such as a trap, jump or branch, an instruction initiation control unit 44 will signal the instruction prefetch unit 42 to start prefetching from the appropriate target address. An externally generated RESET or INTERRUPT signal will also induce the instruction prefetch unit 42 to start prefetching from a new target address. Similarly, the PRECISE and IMPRECISE signals will induce the instruction prefetch unit 42 to vector to the precise and imprecise exception handling routines, respectively.

When an examination of a register scoreboard 46 indicates that the input operands required for the next instruction are available in the designated source registers 14, the instruction initiation control unit 44 will assert the ISSUE and GO signals. Simultaneously, the instruction initiation control unit 44 will signal the scoreboard 46 to SET the "stale" flag associated with the designated destination register 14. In response to the REQUEST signal from a data unit 12', for example, for an opportunity to transfer a result to the designated destination register 14, an instruction termination control unit 48 will assert the STORE signal at the appropriate time. Simultaneously, the instruction termination control unit 48 will signal the scoreboard 46 to CLEAR the "stale" flag associated with the designated destination register 14.

Figure 4:
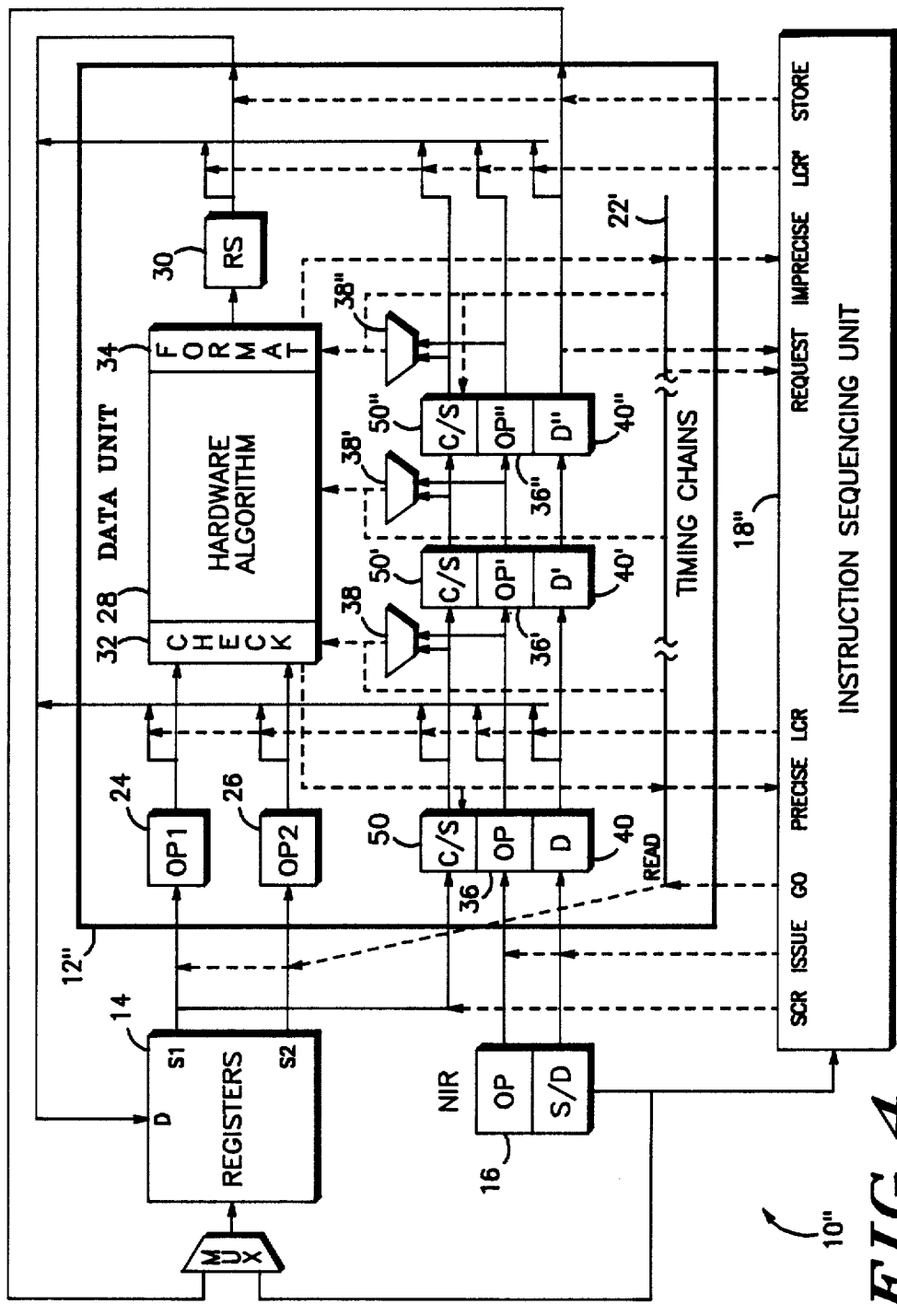
FIG. 4 illustrates in block diagram form a data processor having a modified form of the pipelined data unit of FIG. 2.

In the modified form shown in FIG. 4, a chain of control and status (C/S) buffers 50, 50' and 50" are provided to allow pipeline control and status information to flow through the data unit 12" together with the respective opcode and destination designator information. In general, the control and status buffers 50, 50' and 50" will include control fields for selectively enabling each of the types of exceptions which a particular type of data unit 12" may encounter. For example, separate control fields may be provided to selectively "enable" the recognition of common exceptions such as "invalid operation", "underflow" and "overflow" conditions, and such specific exceptions as "divide by zero". In the preferred form, a special "store control register" (SCR) instruction may be executed to transfer a value, previously loaded into, or "constructed" in, one of the registers 24, from that register 14 into the control and status buffers 50. If a particular type of exception is enabled by having the corresponding control field "set", for example, then the data unit 12" will assert either the PRECISE or IMPRECISE exception signal, as appropriate, when an exception of that type is detected by the input operand check logic 32 or the output result format logic 34, respectively.

Depending upon the type of operations the particular data unit 12" is designed to perform, additional control fields may be provided in the control and status buffers 50, 50' and 50". For example, in a floating-point type of data unit 12", a special field may be provided to select a particular one of the IEEE required rounding modes of the format logic 34. This ability for each instruction to "carry along" its own unique control and status information as it flows through the pipeline effectively allows the data unit 12" to be dynamically reconfigured for each instruction. This is in distinct contrast with the prior art data unit 12 (FIG. 1), which had only a single configuration control register (not shown) and required that the entire pipeline to be "empty" before a change could be made in the configuration of the data unit 12. By providing independent control and status buffers 50, 50' and 50" for each stage of the pipeline, instructions requiring different configurations can simultaneously coexist in the data unit 12", thereby allowing for substantially improved throughput.

If desired, selected fields of the control and status buffers 50, 50' and 50" need not be transferred between stages, when that control information is not required by any of the subsequent stages of the pipeline. However, in the preferred form, all of the control information is preserved through all stages to facilitate recovery in the event of an imprecise exception.

In addition to pipeline control information, the control and status buffers 50, 50' and 50" preferably include a status field for each of the types of exceptions which the data unit 12" may encounter. Thus, for example, the control and status buffers 50, 50' and 50" may include an "invalid operation flag", an "underflow flag", an "overflow flag", and, if appropriate, a "divide by zero flag". If desired, these status flags can be "set" whenever the corresponding exception is detected. However, in the preferred form, these flags are only set when the corresponding type of exception is detected but recognition of that type of exception is disabled by the corresponding exception control field. If multiple exceptions should be detected (and all of the corresponding recognition mechanisms disabled) as an instruction flows through the pipeline, the exception flags will simply "accumulate" in the control and status buffers 50, 50' and 50". If and when appropriate, these accumulated exceptions can be recognized by software, using the "load control register" mechanism described above, and then handled appropriately.

Although the present invention has been described in the context of certain preferred embodiments, various changes, deletions, additions and modifications may be made in those embodiments without departing from the spirit and scope of the invention. For example, although the data processors 10' and 10" have been disclosed as including only single data units 12' and 12", respectively, additional data units (not shown) of similar or different configuration may be included. Similarly, the illustrated data units 12' and 12" may be changed or modified in any of a number of different ways to optimize the performance thereof on particular types of operations. For example, while the data units 12' and 12" are particularly well configured to facilitate efficient execution of floating point operations, only slight modifications would be required to adapt the data units 12' and 12" for highly efficient integer operations, and such changes would not affect the implementations of the present invention as disclosed herein.

What is claimed is:
1. In a pipelined data unit for use in a data processor, a data unit comprising:
an input stage for selectively receiving input operands from said data processor;
a plurality of operation stages for performing selected operations on said input operands to produce an output result, at least a first one of said operation stages, coupled to said input stage, for performing its respective operation in one of a plurality of ways as selected by a value of a control signal;
an output stage, coupled to at least a last one of said operation stages, for selectively providing said output result to said data processor;
instruction buffer means, substantially coincident with said plurality of operation stages, for providing to each of said plurality of operation stages selected information related to a respective one of a plurality of instructions executing in said plurality of operation stages; and
control means, coupled to said plurality of operation stages, for controlling execution of said instructions in each of said plurality of operation stages in accordance with the information relating thereto provided by said instruction buffer means;

the improvement comprising:

control signal buffer means, coupled to said instruction buffer means, for storing, for each of said instructions, a corresponding value of said control signal, and providing said corresponding value of said control signal to said first one of said operation stages substantially coincident with said instruction buffer means providing the corresponding instruction information.

2. The data unit of claim 1 wherein at least a second one of said operation stages provides a status signal, whereby a status signal value indicates a selected condition of the instruction executing in said second one of said operation stages; and wherein the control signal buffer means also store, for each of said instructions, the value of said status signal, and selectively provides said stored status value to said data processor.

3. In a pipelined data unit for use in a data processor, a data unit comprising:

an input stage for selectively receiving input operands from said data processor;

a plurality of operation stages for performing selected operations on said input operands to produce an output result, at least one of said operation stages, coupled to said input stage, for performing its respective operation in one of a plurality of ways as selected by a value of a control signal;

an output stage, coupled to at least a last one of said operation stages, for selectively providing said output result to said data processor;

instruction buffer means, substantially coincident with said plurality of operation stages, for providing to each of said plurality of operation stages selected information related to a respective one of a plurality of instructions executing in said plurality of operation stages; and control means, coupled to said plurality of operation stages, for controlling execution of said instructions in each of said plurality of operation stages in accordance with the information relating thereto provided by said instruction buffer means;

a method for dynamically controlling said data unit, comprising the steps of:

storing, for each of said instructions, a corresponding value of said control signal; and providing said stored value to at least a first one of said operation stages substantially coincident with said instruction buffer means providing the corresponding instruction information.

4. The method of claim 3 further comprising the step of:

providing a status signal from a second one of said operation stages, whereby a status signal value indicates a selected condition of the instruction executing in said second one of said operation stages; and wherein the value of said status signal, for each of said instructions, is also stored and selectively provided to said data processor.

* * * * *